United States Patent [19]
Primeau et al.

[11] Patent Number: 4,972,190
[45] Date of Patent: Nov. 20, 1990

[54] ANALOG SIGNAL DIGITIZER FOR RECORDING ON A VIDEO

[75] Inventors: Gilles Primeau; André Germain, both of Montreal, Canada

[73] Assignee: Aerocorp Technologies Inc., Montreal, Canada

[21] Appl. No.: 364,141

[22] Filed: Jun. 12, 1989

[51] Int. Cl.$^5$ .......................... H03M 1/00; G11B 5/00
[52] U.S. Cl. ..................................... 341/155; 341/141; 341/122; 360/19.1; 360/32; 360/62
[58] Field of Search .......................... 360/19.1, 32, 62; 369/4, 5, 92; 358/11, 341, 144; 341/122, 141, 155

[56] References Cited
U.S. PATENT DOCUMENTS

| 4,677,422 | 6/1987 | Naito | 341/141 |
| 4,752,832 | 6/1988 | Higurashi | 358/341 |
| 4,758,907 | 7/1988 | Okamoto et al. | 360/32 |
| 4,763,206 | 8/1988 | Takahashi et al. | 360/32 |
| 4,772,959 | 9/1988 | Amano et al. | 360/32 |
| 4,791,497 | 12/1988 | Nakano et al. | 360/32 |
| 4,816,926 | 3/1989 | Moriwaki et al. | 360/32 |
| 4,833,549 | 5/1989 | Yoshimoto et al. | 360/32 |

Primary Examiner—William M. Shoop, Jr.
Assistant Examiner—Sharon D. Logan

[57] ABSTRACT

An analog signal digitizer for recording analog signals in a digital form on a video tape of a video cassette player. The digitizer is connectible between an audio production device, such as a compact disc, turntable, or any other audio devices of any quality, and a standard video recorder (VCR). Accordingly, the digitizer acts as an interface device, and converts the analog signals into digital form for recording on the wide band tapes utilized in these standard video recorders. The digitizer has a control circuit at the heart of its system, and it is provided with a memory device to produce control signals in association with audio information digital signals, and arranges these digital signals in a sensitized video-compatible format so that the video cassette treats the output signals of the digitizer as standard television signals.

16 Claims, 1 Drawing Sheet

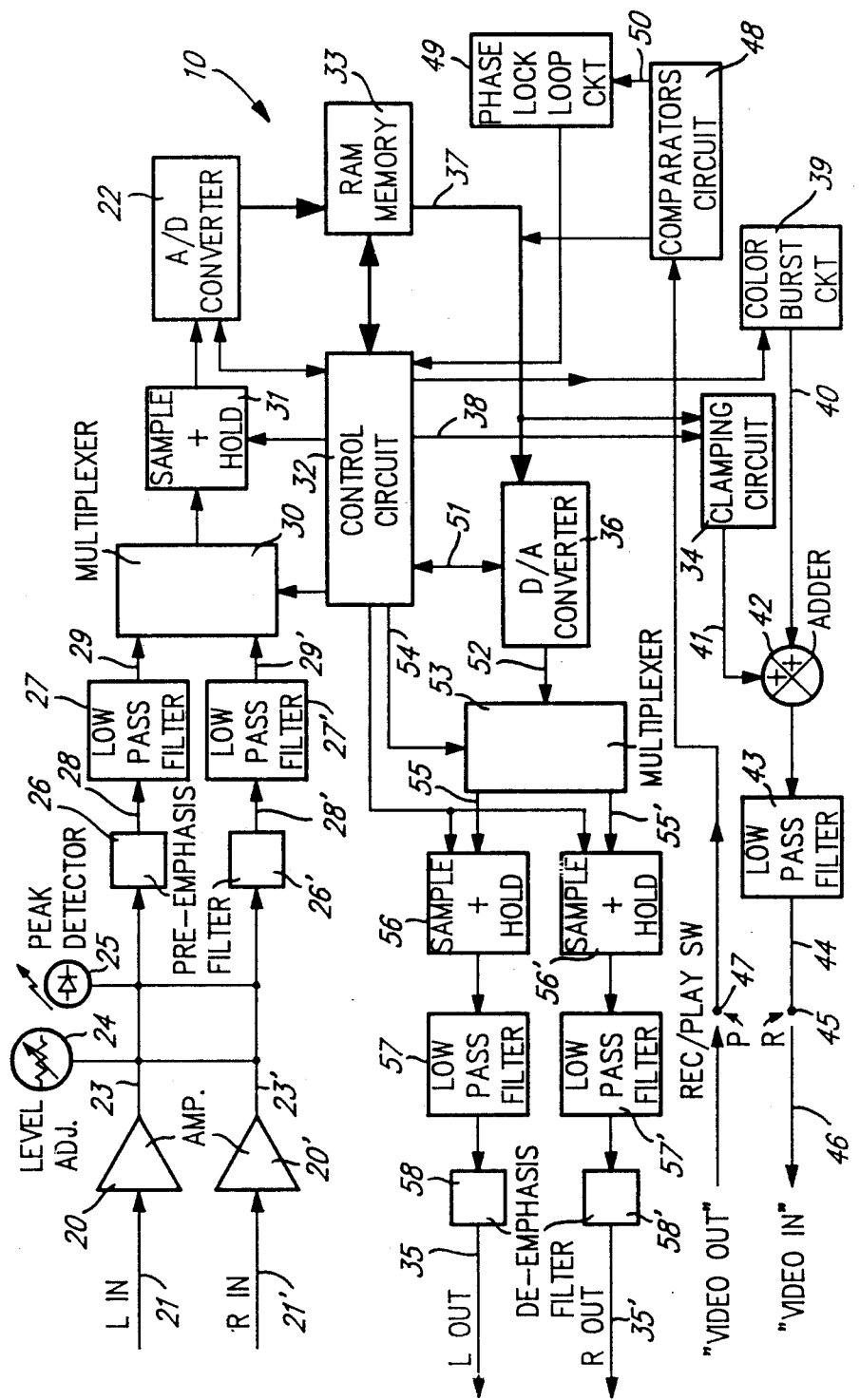

ANALOG SIGNAL DIGITIZER FOR RECORDING ON A VIDEO

BACKGROUND OF THE INVENTION

1. Field of Invention

The present invention relates to a digitizer for converting analog audio signals into digital signals for recording on a video tape of a video cassette recorder.

2. Description of Prior Art

There exists today on the market digital audio tape recorders having a cassette which is different from the conventional audio cassette, and the main purpose of which is to record music numerically. The music information is transformed into a binary code similar to that utilized in computers. It is this code that is registered on the magnetic tape. During playback, the device will decode the information and resynthesize the music with the quality of the music remaining in the same quality as in its original state.

SUMMARY OF INVENTION

It is a feature of the present invention to provide a digitizer device which encompasses the best advantages of digital audio tape players as well as laser disc players, and which permits the recording of music in a digitized form on a video tape of the standard video cassette recorder. This is also done at a cost much inferior to the cost of digital audio tape players. For example, up to eight laser discs can be recorded on a single video cassette.

More particularly, the digitizer of the present invention provides a digitizer device connectible between a high quality audio production device, such as a turntable, compact disc, or any other audio devices of any quality. The digitizer acts as an interface between such devices and any type video cassette recorder whereby to convert the audio analog signal into digital signals for recording on the wide band tapes utilized in these video recorders. The digitized information signals are embedded into a format which is a sensitized NTSC signal for North American and Japanese standards, or a PAL format which can be used with the standard of Europe or other countries. What this means is that the digitizer is producing output synthesized signals with digitized data therein and having all the synchronization signals that are required to drive a TV picture tube, and other control signals that get rid of all the problems that would be encountered if one were to try to record any data on a VCR. In other words, the digitizer makes the VCR treat the digitized data as a standard TV signal for recording onto the tape.

The digitizer also allows owners of video cassette recorders (VCR) to give it a further usage. The recording media (video cassette) is very inexpensive when compared to other medias capable of equivalent performance such as, for example, Digital Audio Tapes (DATs) and Compact Discs (CDs). Since the original audio signals are digitized, reproduction quality is equivalent to that of the original source (for example, a CD player output), and performance is also maintained in time. Data digitizing also eliminates the characteristic hiss sound of analog magnetic tape record/playback devices. Finally, a single video cassette is capable of containing several hours of audio material or material from any analog source, when the device is used as a data acquisition tool. For example, a VHS T-160 cassette will be capable of recording up to 8 hours of music in the "Extended Play" mode.

According to the above-mentioned advantages of the present invention, from a broad aspect, there is provided a digitizer for converting analog signals into digital signals for recording on a video tape of a video cassette recorder. The digitizer comprises input level control means for receiving and adjusting the level of input analog signals. Filter means is provided to limit the spectrum of the input analog signals, and prevent aliasing. Analog-to-digital converter means is also provided for sampling the input analog signals and producing output digital signals corresponding to the input analaog signals. Control circuit means, having a memory device, produces control signals in association with the output digital signals. A formating circuit means is associated with the control circuit means to arrange the control signals and output digital signals into a video compatible format for recording on a video track of a video cassette recorder tape. Output connector means is provided to connect the video compatible format signals to a video input of a video cassette recorder Input connector means is provided to connect to a video output of a video cassette recorder. The input connector means is also connected to a discriminating circuit means to separate the control signals from the digital signals. Output circuit means is further provided to convert the output signals back to its original analog form for connection to a sound producing system.

BRIEF DESCRIPTION OF DRAWINGS

A preferred embodiment of the present invention will now be described with reference to an example thereof illustrated in the accompanying drawings in which:

The single drawing is a block diagram showing the construction of the digitizer of the present invention.

DESCRIPTION OF PREFERRED EMBODIMENTS

Referring now to the block diagram, the digitizer 10 comprises a first and second buffer amplifier 20 and 20' each connected to a respective left and right input connection 21 and 21' of a sound playing device (not shown), such as a turntable or a compact disc player, or any other such audio devices of any quality. If the output of the audio device is mono, then its output is connected to only one of the amplifiers 20 or 20', and only one channel is utilized. A two-channel is herein shown for connection to a stereo audio system.

The buffer amplifiers 20 and 20' are there to augment the level of the incoming audio or analog signals to make it compatible with the level of the analog/digital converter 22, which will be described later. The outputs 23 and 23' of the amplifiers 20 and 20' respectively are connected to a manual level control device 24 which is utilized to adjust the saturation level of the incoming signal. Thus, the user can control the dynamic range of the output signal of the digitizer. Peak detectors 25 in the form of light emitting diodes are also connected across the outputs 23 and 23' to give a visual indication to the user how much his record level control has been altering the incoming signals. The user then has an idea of how much he is altering the incoming analog signals Such devices are standard in sound systems.

The output of the buffer amplifiers 20 and 20' are each connected to a pre-emphasis filter 26 and 26', and these are used to limit the high frequency contents of the incoming analog signals. Low pass filters 27 and 27' are respectively connected to the outputs 28 and 28' of the pre-emphasis filters. These low pass filters are inserted in the circuit to prevent what is known as aliasing, which is common when converting signals from analog to digital. The low pass filters limit the spectrum of the incoming analog signals to give a better conversion at the level of the analog-to-digital converter 22. It is pointed out that the pre-emphasis filters 26 and the low pass filters 27 could, of course, be contained with the analog/digital converter circuit, and they may be replaced by a generic circuit that does both at the same time. Accordingly, these items may not be shown separately as it is in the present block diagram.

The outputs 29 and 29' of the low pass filters 27 and 27' are connected to a multiplexer circuit 30 whereby to give each side of the signals, left and right, a time frame in order to feed the analog-to-digital converter 22. The multiplexer 30 may or may not be required, depending on the final analog/digital converter 22 that is chosen for the system. In other words, the analog/digital converter 22 may have two separate inputs, and therefore a multiplexer would not be required. A multiplexer is herein provided simply to rearrange the signal into a sequential format.

The sample-and-hold circuit 31 is provided to hold the input analog signals for the conversion in the analog/digital converter 22. Otherwise, the signal would be modified and the least significant bits would probably not reflect the true level of the signal. This is a standard means of converting analog data to digital format. The sample-and-hold circuit 30 provides for better accuracy, and is commonly used with such converters. The analog/digital converter 22 as utilized in the present system is a standard component which is capable of sampling speeds which will enable a stereo signal to be sampled fast enough to give the same quality that a CD player will provide. It may have a 14- to 16-bit capability or more, if required, depending on the desired dynamic range. The more bit capability that the converter has, the more quality is the produced signal.

A control circuit means 32 constitutes the heart of the system and controls the information which has been digitized. The control circuit generates all of the timing pulses, and takes care of sending the output data from the converter 22 through its own circuit. It sends this data to an associated RAM memory 33 for temporary storage therein. The control circuit performs many functions to sensitize the production of a true video signal, and therefore does things such as interleaving, which is the mixing up of data, so that if drop-out occurs on the magnetic tape, it will be able to interpolate that there is missing data and recreate a signal that will not give false output signals for playback. Another very important function of the control circuit 32 is that it generates the timing pulses for creating horizontal and vertical synchronization signals which are found on standard TV signals, which may be either NTSC or PAL format.

The control circuit 32 is also off-the-shelf circuitry, and has basically two modes of operation. The first mode is for recording the output digital signals from the converter 22 onto the video tape of a video cassette recorder. To do this, it controls the output digital signals from the converter and uses the static RAM memory as a buffer. It generates the timing signals to create a video format signal, either NTSC or PAL, and conveys all of these information signals to a formating circuit which includes a clamp circuit 34. Through the clamp circuit 34 the digital data output stream from the analog-to-digital converter 22 and the horizontal and vertical synchronization signal, and all other control signals are added together to create a synthesized video compatible output signal so that the video cassette recorder (not shown), which is connected to the output of the digitizer, will not be able to tell the difference between the digitized data and standard video signals.

The clamp circuit 34 provides the voltage levels of the required signals for synchronization. The RAM has an output 37 which is connected to the clamp circuit 34 as well as the output 38 from the control circuit. The control circuit instructs the RAM to send the digital data to the clamp circuit, and at the appropriate time sends horizontal synch signals to gate the digital signals to produce the proper synthesized output signal for the VCR device. The color burst circuit 39 is provided for creating a color reference signal which is required by some VCRs. Some VCR devices use a color burst signal which is 3.57 MHz in order to control tape transport speeds. It is therefore important to introduce that signal at this level. The output 40 from the color burst circuit 39 and the output 41 from the clamp circuit are fed to an adder circuit 42 where they are added together and form the synthesized video signal. This synthesized video signal is then fed to an output low pass filter 43. This filter is not essential, but it is there to improve the performance of the system. It limits the band width of the output signal to prevent problems that may occur later on,—for instance, data could be lost if its frequency content is too high, as the video device would interpolate that data as being color information rather than information digital signals. The output 44 of the low pass filter is connected to an output connector 45 which connects to the VCR "VIDEO-IN" input through a cable 46, as is common with such devices.

In the second mode of operation of the control circuit 32, that being the playback mode, the VCR has its "VODEO-OUT" connection connected to the input connection 47, and the recorded synthesized digital output signal is then sent back to a comparator circuit 48. The comparator circuit discriminates the synthesized composite signal to locate the horizontal synch pulse from the binary information data, that is, binary "1"s or binary "0"s. The synch pulses or control pulses that have been discriminated in the comparators are fed into a phase lock loop circuit 49 through the output connection 50. The phase lock loop circuit generates clocking pulses for the control circuit 32, because the control circuit in the playback mode has its clock generated by the horizontal synch signals from the incoming synthesized video signal. Accordingly, the phase lock loop does the timing control in the playback mode.

The data that has been discriminated and recreated through the comparator circuit 48 and the phase lock loop 49 is controlled and gated through the control device 32. The data is once again de-scrambled into the memory 33, and there is de-interleaving because there was an interleaving scheme that was done in the recording mode. After error correction has been carried out through the control device 32 and interpolating, if lost data has occurred, or muting if too many errors have occurred, the data stream is then gated through to the digital-to-analog converter 36 connected to the output 51 of the control circuit 32. The converter 36 takes the samples that have been regrouped, the audio samples in 14- or 16-bit format, or fewer bit format, or more, if required, and recreates the original analog signal. The timing for the digital-to-analog converter 36 is controlled by the control circuit 32. The output 52 of the converter 36 is connected to an out multiplexer circuit 53 which may or may not be required, as mentioned hereinabove, if using digital/audio converter which has separate outputs. This multiplexer is there to separate the right and left channels, and this is done by the control device 32 which is connected to the multiplexer at its output 54. The same applies for the multiplexer 30 in the recording mode. Left and right channel separation is done by the control device finding out where the synchronization signals have been placed into the synthesized video signal.

The multiplexer has two outputs 55 and 55' connected respectively to an output sample-and-hold circuit 56 and 56' whereby to maintain the signal level constant for each signal while multiplexing it in time. The output of the sample-and-hold circuit respectively connected to an output low pass filter 57 and a de-emphasis filter 58 whereby to limit the output analog signals in frequency content to preamplifiers (not shown) of a standard sound system. Accordingly, the outputs 35 and 35' of the digitizer generate analog signals at standard signal levels for audio operation, and for audio circuitry having standard audio output impedances and voltage levels. The output low pass filters 57 and 57' and the de-emphasis filters 58 and 58' do the adapting at the same time.

It is within the ambit of the present invention to cover any modifications of the preferred embodiment of the present invention provided such modifications fall within the scope of the appended claims. All of the circuits used in the present invention are off-the-shelf circuits, but rearranged in a novel manner to produce the digitizer of the invention.

We claim:

1. A digitizer for converting analog signals into digital signals for recording on a video tape of a video cassette recorder, said digitizer comprising input level control means for receiving and adjusting the level of input analog signals, filter means to limit the spectrum of said input analog signals and prevent aliasing, analog-to-digital converter means for sampling said input analog signals and producing output digital signals corresponding to said input analog signals, control circuit means having a memory device produces control signals in associated with said output digital signals, formating circuit means associated with said control circuit means to arrange said control signals and output digital signals into video compatible format signals for recording on a video track of a video cassette recorded tape, output connector means to connect said video compatible format signals to a video input of video cassette recorder, input connector means to connect to a video output of a video cassette recorder, said input connector means being connected to discriminating circuit means to separate said control signals from said output digital signals, output circuit means to convert said output digital signals back to its original analog form for connection to a sound producing system, said control circuit means having a first mode of operation for recording said output digital signals on a video tape of a video cassette recorder, and a second mode for reconverting the output digital signals recorded on said video tape back to its original analog format; said input level control means comprises adjusting means connected to each of said channels to adjust the level of said input analog signals, and frequency content control means to limit the high frequency content of said signals.

2. A digitizer as claimed in claim 1 wherein there are two separate analog signals, one for a right and one for a left channel of a stereophonic source, each analog signal being connected to a respective one of said level control means, said analog-to-digital converter means having sequencing means to rearrange analog output signals from said level control means into a sequential format.

3. A digitizer as claimed in claim 1 wherein said sequencing means comprises a multiplexer circuit to insert a time frame in said analog output signals from each said level control means and rearranged said signals to said sequential format, and a sample-and-hold circuit to hold the level of said sequential format signals.

4. A digitizer as claimed in claim 1 wherein said adjusting means is a preamplifier, and light emitting diodes are connected to said output of said preamplifier to provide a visual indication of adjustments of the dynamic range of said signals effectuated by manual level control means, said frequency content control means being a pre-emphasis filter connected to an output of said preamplifier.

5. A digitizer as claimed in claim 1 wherein said filter means is a low pass filter connected to said output of said preamplifier.

6. A digitizer as claimed in claim 2 wherein said control circuit means includes a master clock pulse generator, a television synch generator and counter and directs said output digital signals from said analog-to-digital converter into said memory device for use with said formating circuit means for creating video compatible signals.

7. A digitizer as claimed in claim 6 wherein said formating circuit means comprises a clamp circuit for gating said output digital signals to said video compatible signals.

8. A digitizer as claimed in claim 7 wherein said formating circuit further comprises a color burst circuit for creating color reference signals which are incorporated into said video compatible signals.

9. A digitizer as claimed in claim 8 wherein said clamp circuit and said color burst circuit are combined in an adder circuit which is connected to an output low pass filter to limit the bandwidth of said video compatible signals.

10. A digitizer as claimed in claim 8 wherein said output connector means is a cable connected to an output of said output low pass filter and a video-in input of a video cassette recorder.

11. A digitizer as claimed in claim 6 wherein said discriminating means comprises a comparator circuit to discriminate between control pulses and digital data signal pulses, said control pulses being fed to a phase lock loop circuit to produce clock pulses for said control circuit means to decipher said digital signals in said formated signal and restore them in said memory device for feeding same, as determined by said control means, to said output circuit means.

12. A digitizer a claimed in claim 11 wherein said output circuit means comprises a digital-to-analog inverting said output digital signals back to their original analog form signals, and output filter means to limit the frequency spectrum of said original analog signals to output to preamplifiers of said sound producing system.

13. A digitizer as claimed in claim 12 wherein said output filter means comprises an output low pass filter connected to an output de-emphasizing filter.

14. A digitizer as claimed in claim 13 wherein said digital-to-analog converter circuit has an output connected to an output multiplexer circuit to separate right and left channel original analog signals, said multiplexer circuit having a right and left channel output each connected to an output sample-and-hold circuit.

15. A digitizer as claimed in claim 14 wherein said output sample-and-hold circuits are each connected to a respective one of said output low pass filters, each of which having an output de-emphasis filter.

16. A digitizer as claimed in claim 2 wherein said analog-to-digital converter has at least a 14-bit rate capability, said memory device being a random access memory device.

* * * * *